(12) United States Patent
Huang (10) Patent No.: US 9,525,231 B2
(45) Date of Patent: Dec. 20, 2016

(54) FLASH DRIVE WITH ECCENTRICALLY ROTATABLE COVER

(71) Applicant: HOEY CO., LTD., Taoyuan (TW)

(72) Inventor: Joseph Huang, Taoyuan (TW)

(73) Assignee: HOEY CO., LTD., Taoyuan (TW)

( * ) Notice: Subject to any disclaimer, the term of this patent is extended or adjusted under 35 U.S.C. 154(b) by 0 days.

(21) Appl. No.: 14/795,302

(22) Filed: Jul. 9, 2015

(65) Prior Publication Data

US 2016/0099515 A1  Apr. 7, 2016

(30) Foreign Application Priority Data

Oct. 1, 2014  (TW) .............................. 103217452 U (51) Int. Cl.
| | | |
|---|---|---|
| *G06F 1/16* | (2006.01) | |
| *H01R 13/447* | (2006.01) | |
| *G06F 1/18* | (2006.01) | |

(52) U.S. Cl.
CPC ............. *H01R 13/447* (2013.01); *G06F 1/182* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,926,544 B2 * | 8/2005 | Lee ....................... | H01R 13/447 439/147 |
| 6,932,629 B2 * | 8/2005 | Ikenoue ............... | H05K 5/0278 439/136 |
| 7,295,431 B2 * | 11/2007 | Chuang ............ | G06K 19/07732 16/324 |
| 7,462,044 B1 * | 12/2008 | Regen ................ | H01R 13/6641 439/131 |
| 7,500,858 B2 * | 3/2009 | Emerson .............. | H01R 13/447 439/131 |
| 7,503,780 B1 * | 3/2009 | Huang ............... | H01R 13/4538 439/135 |
| 7,530,823 B1 * | 5/2009 | Thornton ............. | H01Q 1/2275 439/131 |
| 7,544,073 B2 * | 6/2009 | Nguyen ........... | G06K 19/07732 439/135 |
| 7,713,074 B2 * | 5/2010 | Poo ....................... | H01R 13/447 439/136 |
| 8,179,670 B2 * | 5/2012 | Huang .................. | B21D 31/02 361/679.02 |
| 8,246,362 B2 * | 8/2012 | Ma ....................... | H01R 13/447 361/752 |
| 8,974,238 B2 * | 3/2015 | Chou ................... | H01R 13/447 361/725 |
| 9,202,089 B2 * | 12/2015 | Yang .................... | G06K 7/0004 |

(Continued)

*Primary Examiner* — Lisa Lea Edmonds
(74) *Attorney, Agent, or Firm* — Guice Patents PLLC (57) ABSTRACT

A flash drive includes a housing, a storage module, a plug head, a positioning element and a rotatable cover. The housing has an inner space formed by a front wall and a rear wall for accommodating other elements. The storage module has a metal sheet at one end for connecting a connecting plate including a plurality of metal terminals and a plurality of welding pads at the other end for connecting a plug head. The positioning element positions the storage module in the housing and the plug head protruding from a lateral wall of the housing (the top wall of the housing). The rotatable cover is eccentric-rotatably disposed on the housing to cover or uncover the plug head.

8 Claims, 7 Drawing Sheets

(56) References Cited

U.S. PATENT DOCUMENTS

| | | | | |
|---|---|---|---|---|
| 9,215,820 | B2 * | 12/2015 | Villa-Real | H05K 5/0278 |
| 2005/0079738 | A1 * | 4/2005 | Ahn | H01R 13/447 |
| | | | | 439/1 |
| 2012/0268887 | A1 * | 10/2012 | Pan | H05K 5/0278 |
| | | | | 361/679.32 |
| 2013/0107442 | A1 * | 5/2013 | Zhou | H01R 13/447 |
| | | | | 361/679.32 |
| 2013/0183841 | A1 * | 7/2013 | Stevens | H01R 13/447 |
| | | | | 439/131 |
| 2013/0217248 | A1 * | 8/2013 | Stevens | H01R 13/447 |
| | | | | 439/131 |
| 2016/0098066 | A1 * | 4/2016 | Huang | G06F 1/181 |
| | | | | 361/679.32 |

\* cited by examiner

FIG. 9

FLASH DRIVE WITH ECCENTRICALLY ROTATABLE COVER

BACKGROUND OF THE INVENTION

Field of the Invention

The invention relates to a flash drive with eccentrically rotatable cover, wherein the rotatable cover can be opened or closed quickly and avoided to be lost.

Description of the Related Art

Flash drives are a memory for quick storing and transmitting data. The universal serial bus (USB) is often adapted to be the interface of the flash drives. Flash drives are broadly used in many technical fields for storing and transmitting data. As the mobile phones, cameras and tablets develop, flash drives become diversified. Flash drives are required to connect USB connectors and connect to micro USB connectors. Such storage devices using USB interface are small and portable, they also develop various connection type for various electronic devices.

Flash drives includes memory units, circuit boards and housing. The circuit board is connected to a USB plug protruding from the housing. The flash drive is connected to an electronic device through the USB plug inserted into a USB socket of the electronic device.

A cover is often needed for protecting the USB plug. When a flash drive is not used or stored, the cover can shelter the USB plug. The cover must be put to the USB plug or removed from the USB plug, which is inconvenient for users. The cover is often lost when it is removed from the USB plug and put in somewhere.

BRIEF SUMMARY OF THE INVENTION

The invention provides a flash drive. The flash drive in accordance with an exemplary embodiment of the invention includes a housing including a front wall, a rear wall, a lateral wall and an inner space formed by the front wall and the rear wall, wherein a slot is formed on the lateral wall, a front hole is formed eccentrically on a corner of the front wall, an eccentric rotation positioning structure is disposed eccentrically on a corner of the rear wall corresponding to the corner of the front wall, and the eccentric rotation positioning structure includes a rear hole corresponding to the front hole and a limiting mechanism; a storage module mounted in the housing; a plug head connected to the storage unit and protruding from the housing through the slot; a positioning element positioning the storage unit in the housing; a rotatable cover including a front plate, a rear plate, a top plate, a groove formed by the front plate and the rear plate and opening downwards; a front shaft extending from the front plate to rotatably fit the front hole; a rear shaft extending from the rear plate to rotatably fit the rear hole; a first protrusion and a second protrusion disposed on two sides of the rear shaft, wherein the rear shaft rotatably fits the rear hole in such a manner that the first and second protrusions are positioned to the limiting mechanism.

In another exemplary embodiment, the limiting mechanism includes an arced groove formed near the rear hole, a first concave portion and a second concave portion spaced from the first concave portion.

In yet another exemplary embodiment, the front shaft and the rear shaft are concave shafts and integrated with the rotatable cover.

In another exemplary embodiment, an engaging hole is formed on the front wall, and the positioning element includes an inclined spring sheet engaging with the engaging hole.

In yet another exemplary embodiment, a shoulder is formed between the storage unit and the plug head, the plug head includes an inner hole, and the positioning element includes an outer post engaging the shoulder and an inner post fitting the inner hole.

In another exemplary embodiment, a boss is disposed around the front hole.

In yet another exemplary embodiment, the top plate includes a hole.

In another exemplary embodiment, the rotatable cover includes a concave portion formed on the front shaft, an accessory is mounted to the concave portion.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
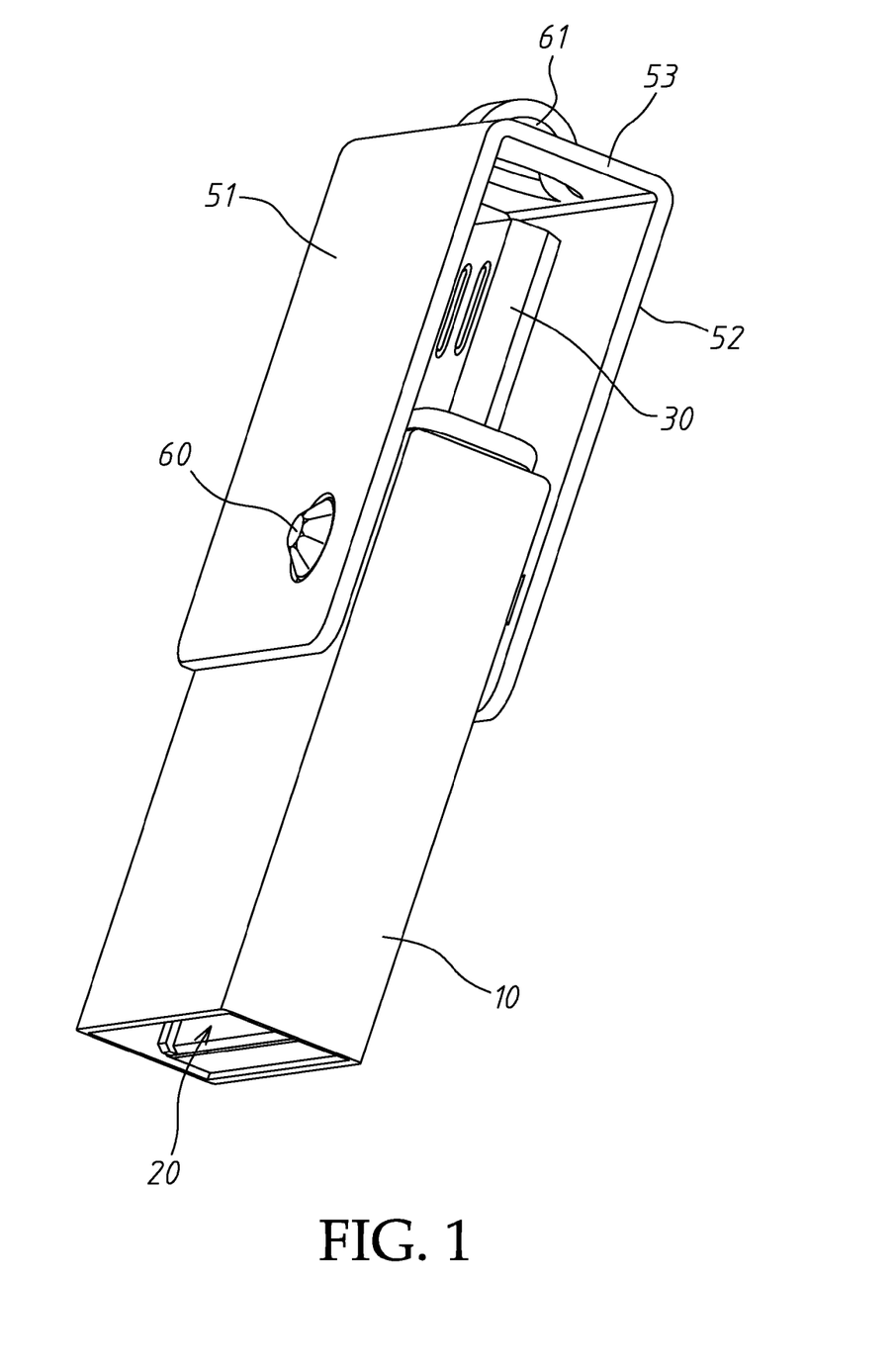
FIG. 1 is a perspective view of an embodiment of a flash drive of the invention.
Figures 2, 2A:
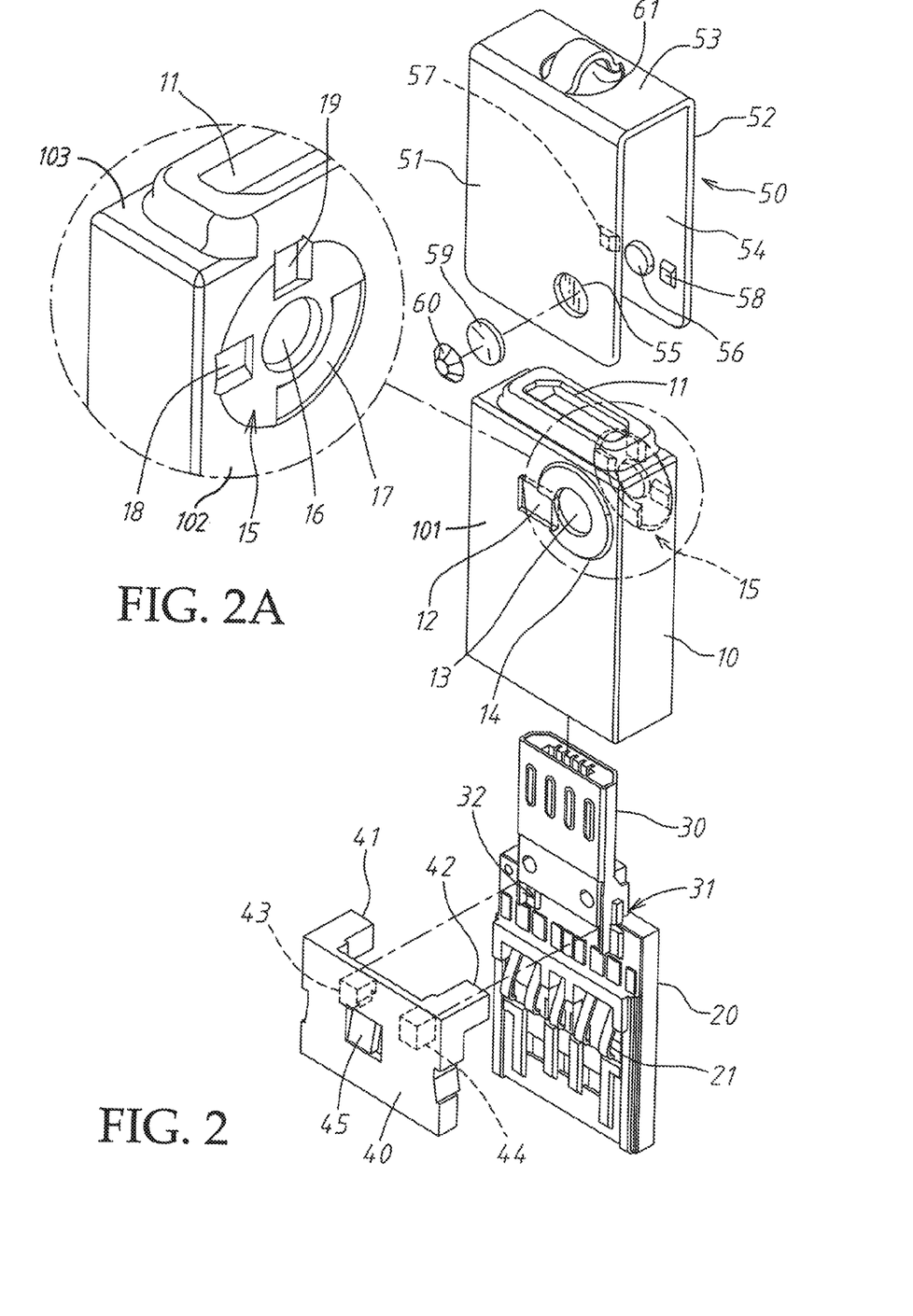
FIG. 2 is an exploded view of FIG. 1.
FIG. 2A is an enlarged view of a portion of a housing of the flash drive of FIG. 2.
Figure 3:
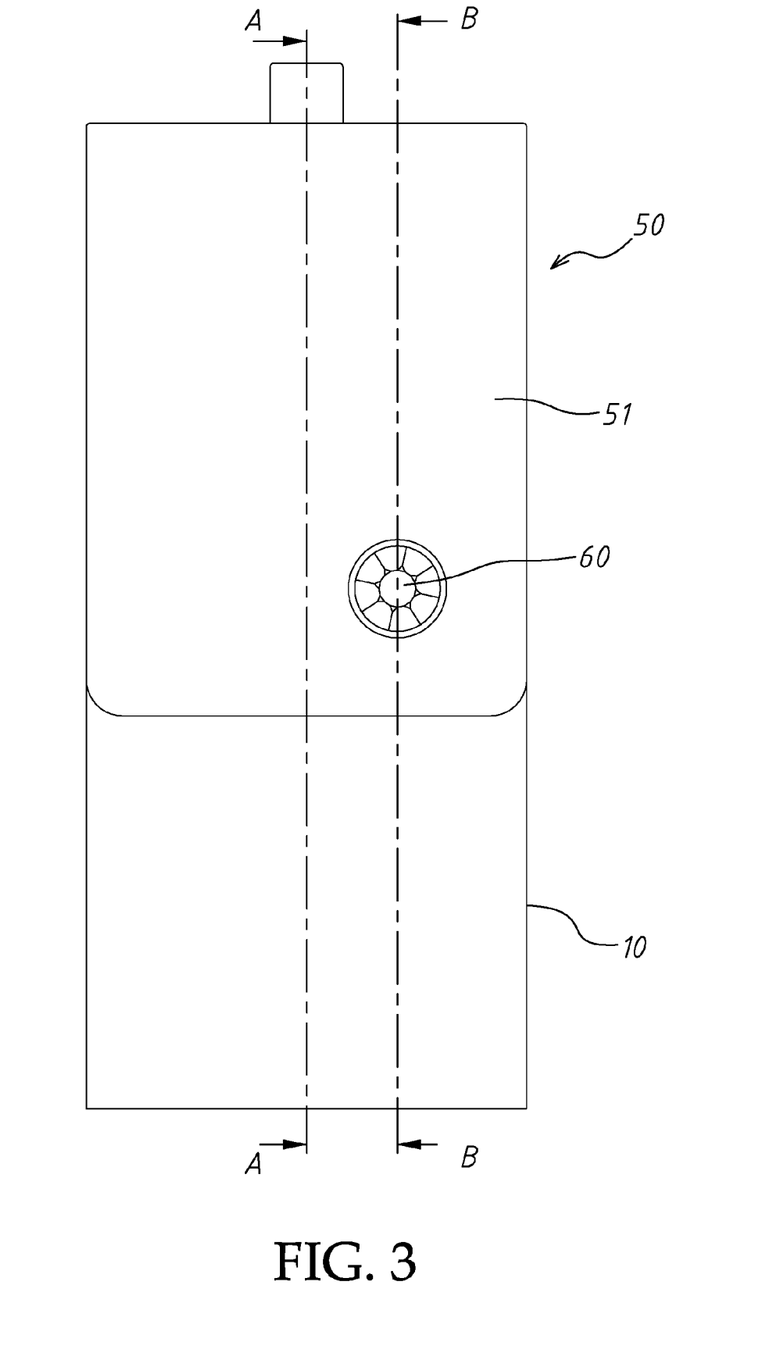
FIG. 3 is a front view of FIG. 1.

Referring to FIGS. 1, 2 and 3, a flash drive includes a housing 10, a storage module 20, a plug head 30, a positioning element 40 and a rotatable cover 50. The housing 10 has an inner space formed by a front wall 101 and a rear wall 102 for accommodating other elements. The storage module 20 has a metal sheet at one end for connecting a connecting plate including a plurality of metal terminals 21 and a plurality of welding pads at the other end for connecting a plug head 30. The positioning element 40 positions the storage module 20 in the housing 10 and the plug head 30 protruding from a lateral wall 103 of the housing 10 (the top wall of the housing 10). The rotatable cover 50 is eccentric-rotatably disposed on the housing 10 to cover or uncover the plug head 30.

The housing 10 has a slot 11 having a cross section shape corresponding to a cross section of the plug head 30, an engaging hole 12 formed on the front wall 101 of the housing 10 and a boss 14 disposed around a front hole 13 formed on the front wall 101. An eccentric rotation positioning structure 15 is disposed eccentrically on a corner of the rear wall 102. The eccentric rotation positioning structure 15 has a limiting mechanism. Please see FIG. 2A, the eccentric rotation positioning structure 15 has a rear hole 16. In this embodiment, the limiting mechanism includes an arced groove 17 disposed near the rear hole 16, a first concave portion 18 and a second concave portion 19. In this embodiment, the arced groove 17 is an arc of 90°. The first concave portion 18 is spaced from the second concave portion 19 by an angular distance of 90°.

Figure 4:
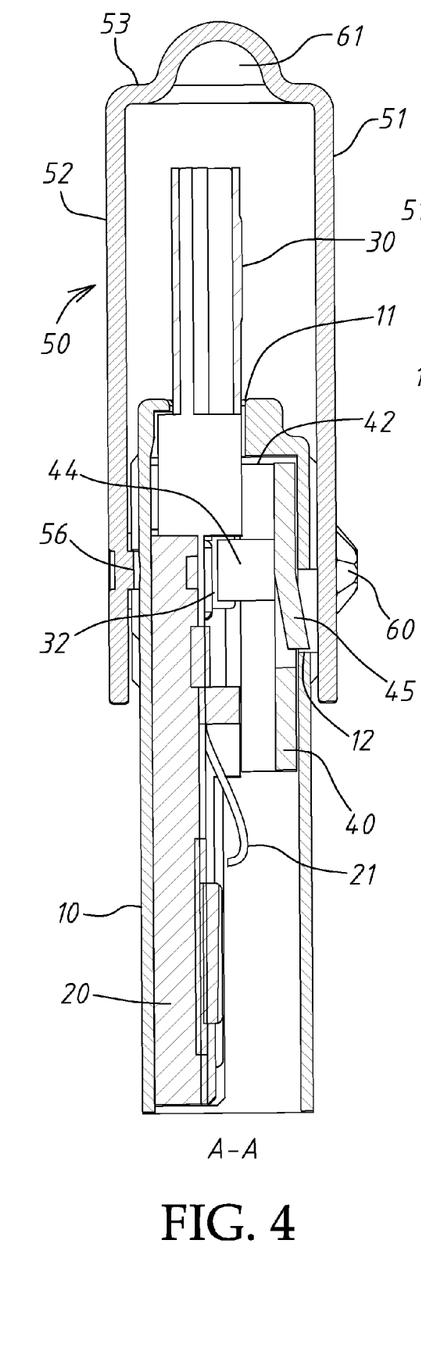
FIG. 4 is a cross section of FIG. 3 along A-A line.
Figure 5:
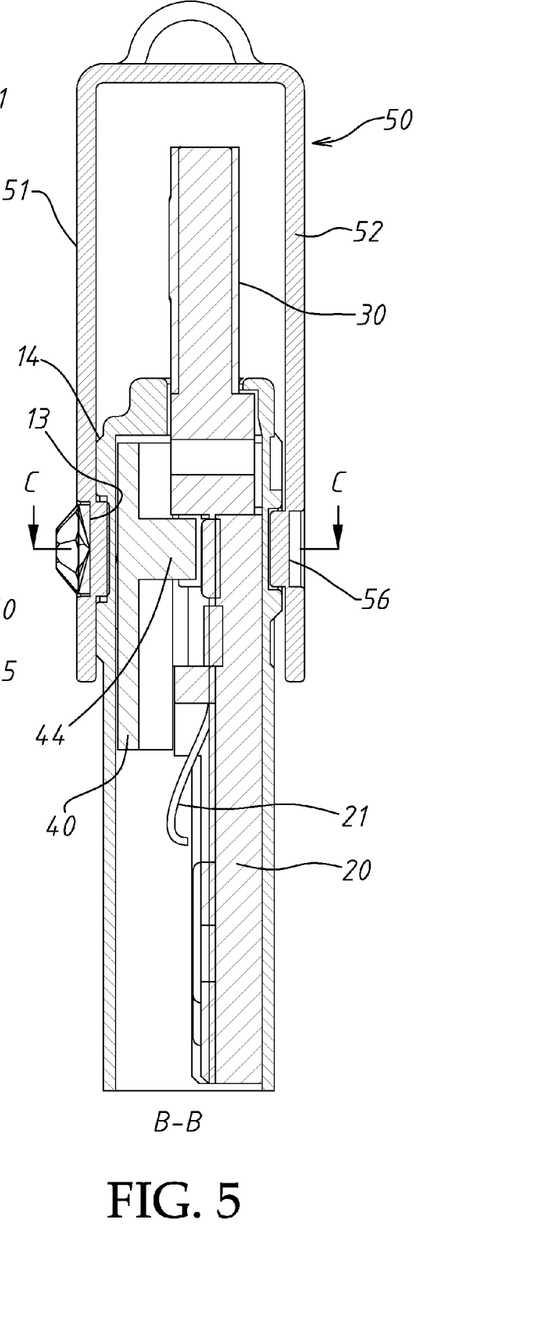
FIG. 5 is a cross section of FIG. 3 along B-B line.

The positioning element 40 combines the storage module 20 and the plug head 30 in the housing 10. The positioning element 40 includes two outer posts 41 and 42 engaging a shoulder 31 formed by the storage module 20 and the plug head 30 and two inner posts 43 and 44 inserted into two inner holes 32 formed near a bottom of the plug head 30 (see FIGS. 2, 4 and 5). The positioning element 40 has a inclined spring sheet 45 engaging the engaging hole 12 to combine the storage module 20 and the plug head 30 to the housing 10, and the boss 14 presses an inner surface of the rotatable cover 50 to become a tightly assembled structure.

Figure 6:
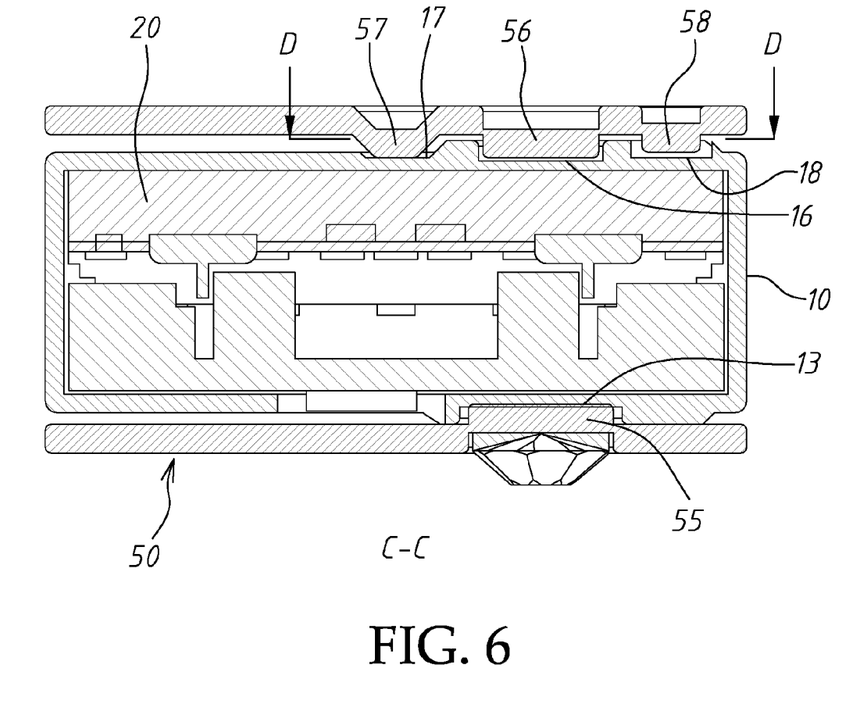
FIG. 6 is a cross section of FIG. 5 along C-C line.
Figure 7:
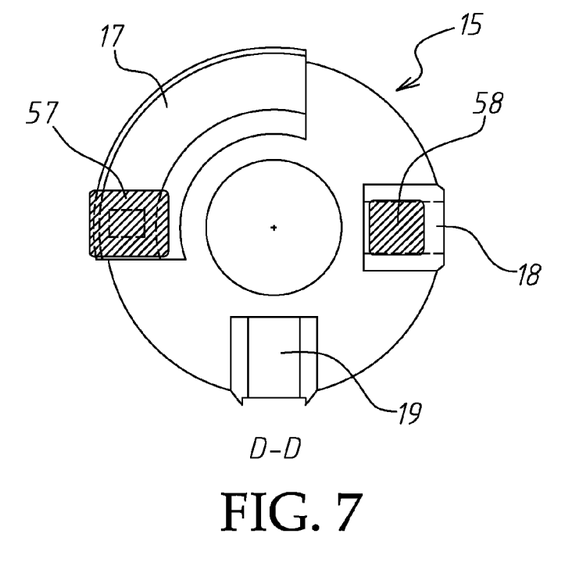
FIG. 7 is a cross section of FIG. 6 along D-D line.

The rotatable cover 50 includes a front plate 51, a rear plate 52 and a top plate 53. A groove 54 is formed by the front plate 51 and the rear plate 52. A front shaft 55 is formed by punching the front plate 51. A rear shaft 56 is formed on the rear plate 52 and corresponds to the front shaft 55. A first protrusion 57 and a second protrusion 58 are disposed besides the rear shaft 56. In this embodiment, the front shaft 55 has a concave portion, and a pad 59 is disposed in the concave portion for mounting an accessory 60. A hole 61 is formed on the top plate 53 for connecting other devices such as a key collecting device. The groove 54 can receive the plug head 30 so that the plug head 30 is sheltered. Please see FIGS. 2, 6 and 7, the front shaft 55 is rotatably fitted to the front hole 13, and the rear shaft 56 is rotatably inserted into the rear hole 16, whereby the first protrusion 57 abuts one end of the arced groove 17, and the second protrusion 58 engages the first concave portion 18, at this time, the first protrusion 57 and the second protrusion 58 moves to a first position.

Figure 8:
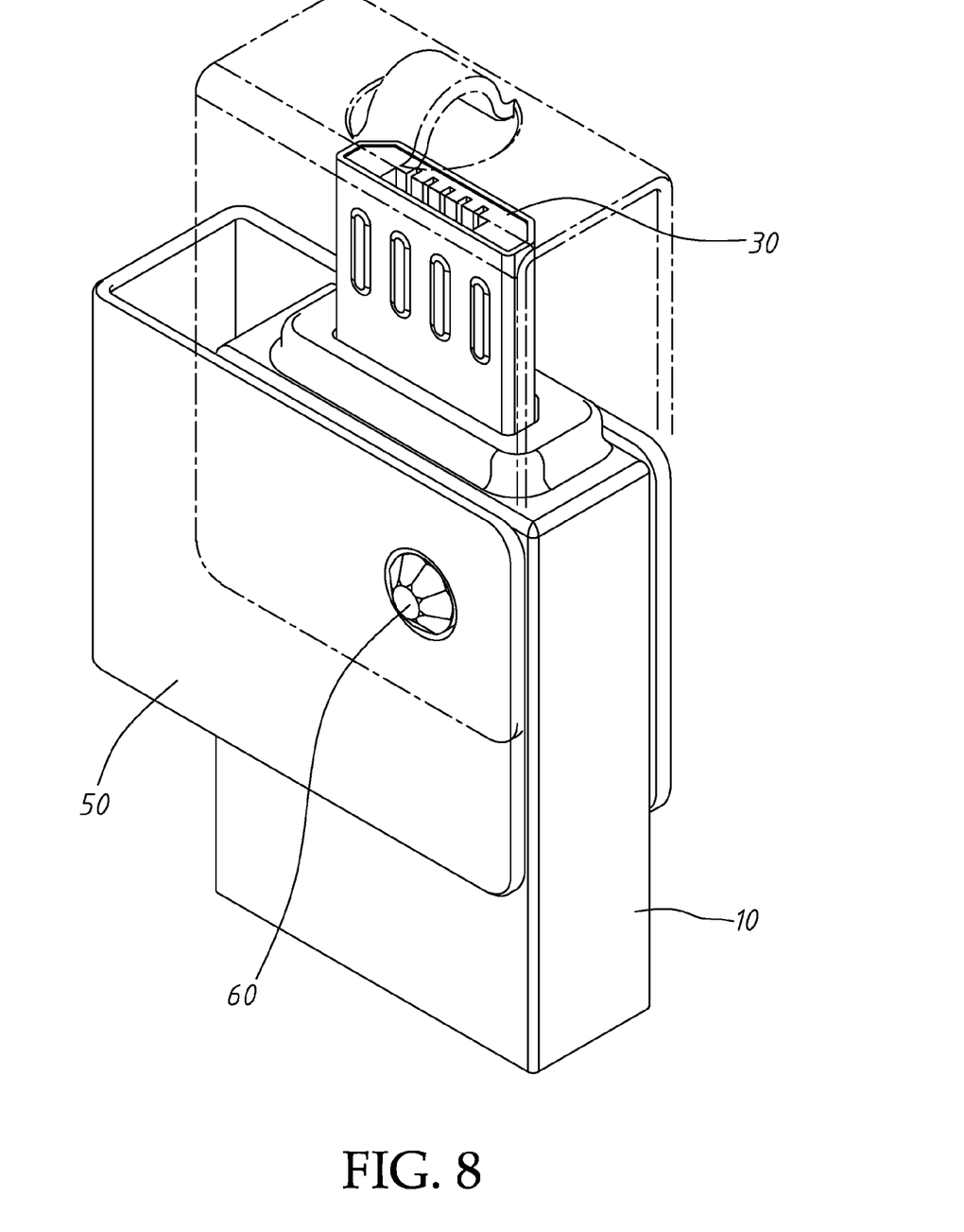
FIG. 8 is a perspective view of FIG. 1, wherein a rotatable cover is opened.

When the rotatable cover 50 is rotated by an external force, the rotatable cover 50 is rotated about the front shaft 55 and the rear shaft 56, and the first protrusion 57 moves from one end of the arced groove 17 to the other end of the arced groove 17. At the same time, the second protrusion 58 moves from the first concave portion 18 to the second concave portion 19. At this time, the first protrusion 57 and the second protrusion 58 move to a second position, and the rotatable cover 50 is opened and positioned to reveal the plug head 30. The operation can be reversed to rotate the rotatable cover 50 from the second position to the first position to shelter the plug head 30.

Figure 9:
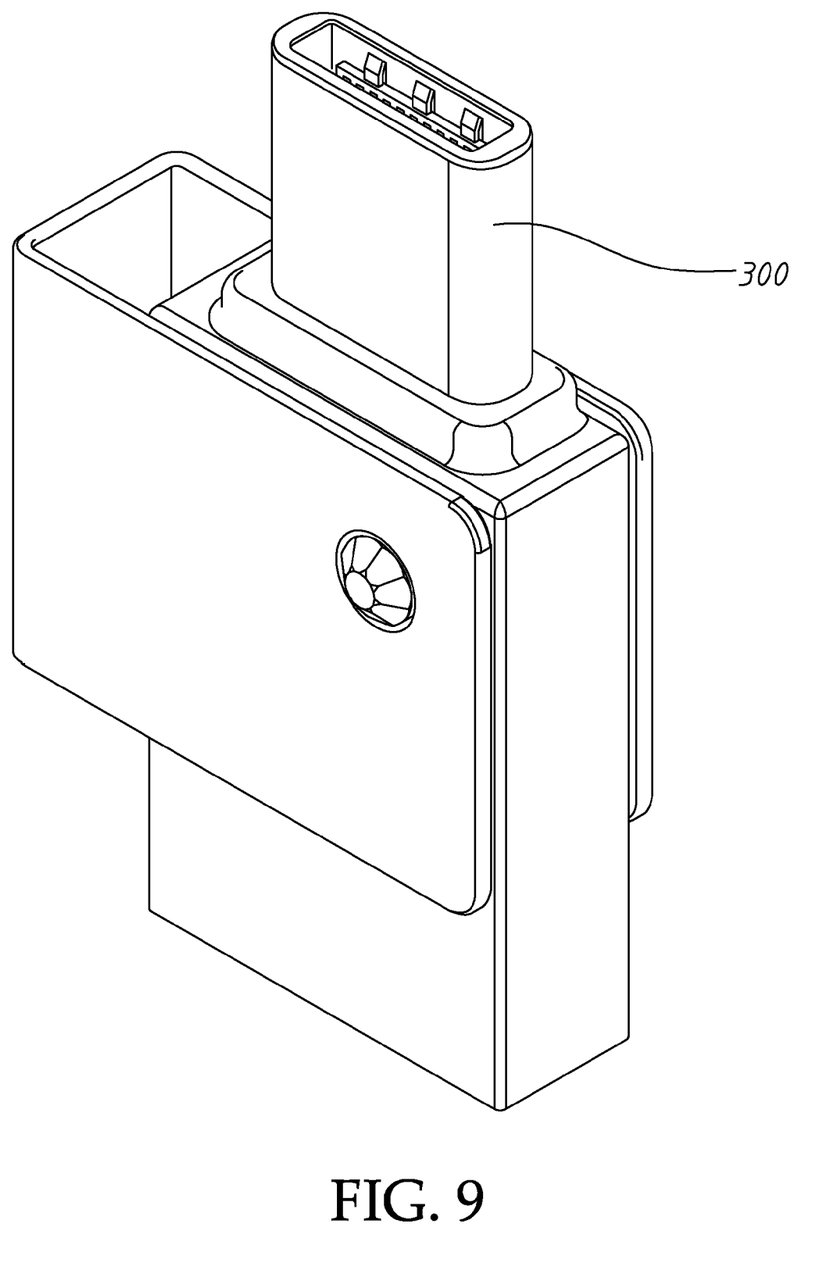
FIG. 9 is a perspective view of another embodiment pf a flash drive of the invention.

Since USB-IF (USB Implementers Forum) issues a new specification of USB 3.1 regarding new micro USB which is called USB 3.1 TYPE C as shown in FIG. 9. USB 3.1 TYPE C increases current and transmitting speed and can connected in two directions. The invention is applied to the plug 300 of USB 3.1 TYPE C.

The invention provides a new flash drive, wherein the rotatable cover 50 is quickly opened or closed. Since the rotatable cover 50 is connected to the housing 10, the rotatable cover 50 is not lost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash drive with eccentrically rotatable cover, comprising:
    a housing comprising a front wall, a rear wall, a lateral wall and an inner space formed by the front wall and the rear wall, wherein a slot is formed on the lateral wall, a front hole is formed eccentrically on a corner of the front wall, an eccentric rotation positioning structure is disposed eccentrically on a corner of the rear wall corresponding to the corner of the front wall, and the eccentric rotation positioning structure comprises a rear hole corresponding to the front hole and a limiting mechanism;
    a storage module mounted in the housing;
    a plug head connected to the storage unit and protruding from the housing through the slot;
    a positioning element positioning the storage unit in the housing;
    a rotatable cover comprising a front plate, a rear plate, a top plate, a groove formed by the front plate and the rear plate and opening downwards;
    a front shaft extending from the front plate to rotatably fit the front hole;
    a rear shaft extending from the rear plate to rotatably fit the rear hole;
    a first protrusion and a second protrusion disposed on two sides of the rear shaft, wherein the rear shaft rotatably fits the rear hole in such a manner that the first and second protrusions are positioned to the limiting mechanism.

2. The flash drive as claimed in claim 1, wherein the limiting mechanism comprises an arced groove formed near the rear hole, a first concave portion and a second concave portion spaced from the first concave portion.

3. The flash drive as claimed in claim 1, wherein the front shaft and the rear shaft are concave shafts and integrated with the rotatable cover.

4. The flash drive as claimed in claim 1, wherein an engaging hole is formed on the front wall, and the positioning element comprises an inclined spring sheet engaging with the engaging hole.

5. The flash drive as claimed in claim 4, wherein a shoulder is formed between the storage unit and the plug head, the plug head comprises an inner hole, and the positioning element comprises an outer post engaging the shoulder and an inner post fitting the inner hole.

6. The flash drive as claimed in claim 1, wherein a boss is disposed around the front hole.

7. The flash drive as claimed in claim 1, wherein the top plate comprises a hole.

8. The flash drive as claimed in claim 1, wherein the rotatable cover comprises a concave portion formed on the front shaft, an accessory is mounted to the concave portion.

* * * * *